Patented Sept. 9, 1924.

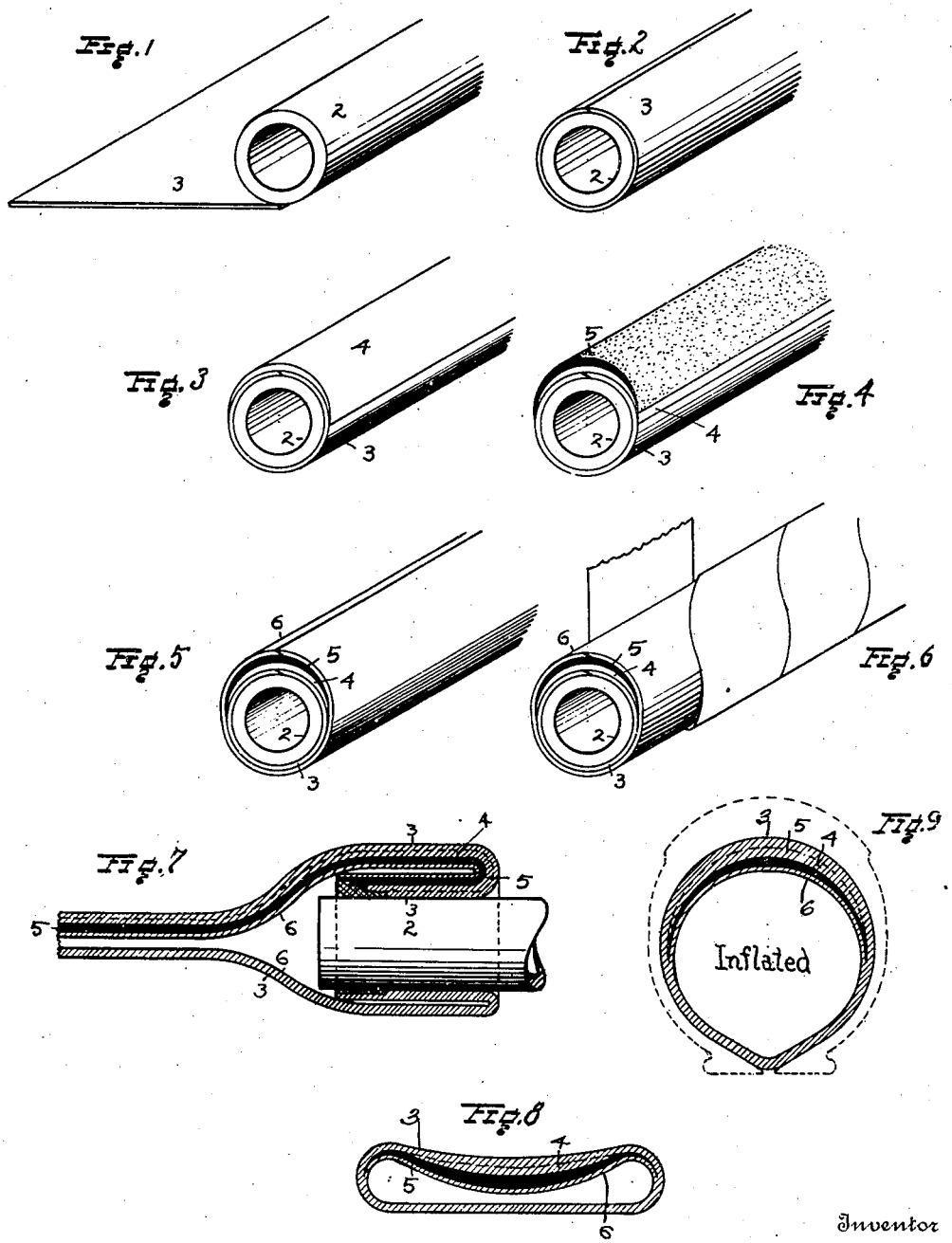

1,507,646

UNITED STATES PATENT OFFICE.

WILLIAM W. WILDMAN, OF BAY CITY, MICHIGAN, ASSIGNOR TO THE WILDMAN RUBBER COMPANY, OF BAY CITY, MICHIGAN, A CORPORATION OF DELAWARE.

SELF-SEALING INNER TUBE AND PROCESS OF PRODUCING SAME.

Application filed November 21, 1921. Serial No. 516,674.

*To all whom it may concern:*

Be it known that I, WILLIAM W. WILDMAN, a citizen of the United States, residing at Bay City, in the county of Bay and State of Michigan, have invented certain new and useful Improvements in Self-Sealing Inner Tubes and Processes of Producing Same, of which the following is a specification.

This invention relates to inflatable self-sealing inner tubes for penumatic tires and a process of producing such tubes entirely of rubber, and the invention is an improvement in the tube and process described in the patent issued to W. W. Wildman et al., Feb. 27, 1917, No. 1,217,888, my general object being to produce an endless self-sealing tube in a more satisfactory and facile way than formerly and to provide a better tube giving better results by omitting certain parts, and bringing the remaining parts together in a different way.

In the accompanying drawing, Figs. 1 to 7 are perspective and sectional views illustrating the sequence of steps taken in producing my improved self-sealing inner tube, and Figs. 8 and 9 are cross sections of the completed tube, deflated and inflated, respectively.

In producing my improved self-sealing tube, a straight round mandrel 2 is used, preferably of steel or aluminum, polished on the outside. This mandrel is approximately ten feet in length, but the length of the rubber put on the mandrel depends upon the diameter of the tire tube to be made.

The first sheet 3 of rubber used is a so-called inner-tube stock "A" compounded with sulphur or some other ingredient capable of vulcanizing the rubber. This first ply 3 is rolled around the mandrel and the edges either butted together or lapped, substantially as shown in Fig. 2.

The next operation consists in applying a crescent-shaped piece 4 of rubber lengthwise upon the first ply 3, the width of this piece or strip 4 being such as to cover one half of the mandrel and ply 3, see Fig. 3. Strip 4 is a compounded rubber stock containing sulphur and other ingredients to promote vulcanization of the rubber, and this stock is such that when vulcanized it will be very solid and possess the property of strongly resisting pulling and stretching strains, the object being to limit the stretch in the tread side of the tube, especially after it has been turned inside out and completed.

The next proceeding is to apply a crescent-shaped strip 5 of raw gum directly upon and lengthwise of strip or ply 4, see Fig. 4. This raw rubber strip 5 is sticky or tacky, being a commercial gum without anything taken from it or anything whatever added to it.

The next step consists in wrapping or rolling a sheet or ply 6 of vulcanizable rubber around all the material that has already been placed on the mandrel, or in other words around plies 3, 4 and 5, and the edges of ply 6 may either be butted together or overlapped, see Fig. 5. This finishes the making of an all-rubber tube with a thickened rubber tread embodying a substantially unvulcanizable raw rubber strip.

Then the next operation is to wrap this tube from end to end tightly within a muslin wrapper to place the rubber under compression, see Fig. 6. When a large number of these tubes have been wrapped they are placed together on an iron rack situated on an iron truck, which is made to convey them into a steam heater. When the door of this heater is closed, steam is turned into the heater for a given length of time, according to well known practices, until the tubes are vulcanized.

During vulcanization, ply 5 which is the raw gum, absorbs enough sulphur from plies 4 and 6 to cause the meeting surfaces of all to be vulcanized together, but the inner volume of crude rubber in ply 5 remains in the raw state. Plies 3, 4 and 6 are also vulcanized together at their meeting faces, so that the vulcanized tube becomes a solid single-piece rubber tube.

After the tube is vulcanized, as stated, the muslin wrapper is removed and the tube removed from the metal mandrel by doubling the tube back upon itself and stripping it from the mandrel. In other words the tube is turned inside out when taking it from the mandrel. This operation forces the ply 5 of crude rubber into a smaller space than it was in when the tube was built up and vulcanized, and for this reason the raw rubber ply is compressed at every point. Ply 3 which was on the inside but is now on the outside, is slightly stretched and the more solid and inelastic strip 4 of rubber is under compression as well as the crude rubber ply 5.

The next operation involves the placing of the usual metal valve (not shown) in the thin side of the tube, that is the side that will be next to the steel vehicle rim when the tube is in use. Then the ends of the tube are spliced together, this splice being made in telescoping the stepped ends of the tube, so that a tube is produced which will be self-healing at every point.

The tube is also made oversize, that is, larger than the standard tubes now being manufactured so that when the self-healing tube is placed in a tire casing, the rubber in the tube is stretched very little, if any, in order to fully inflate the tire casing. The purpose of this is to leave the compression in the raw gum, but if any stretch is necessary, it will be where there is the least resistance, that is, at the thinner part of the tube next to the steel rim when the tube is in use.

Another reason for making the tube oversize, is to avoid placing the rubber under stretch when the tube is in use, and so that the tube will last longer than the tire casing or shoe, in fact long enough to wear out three or four sets of tire casings. Standard tubes as now manufactured are only about two-thirds the size of the tire casings inside,—the result is that when standard tubes are in use they are under stretch at every point, and after being used for several months the average tube will take and retain its permanent stretch. In many cases it is impossible to use them over again in case they are taken out for repairs, for the reason that it is impossible to get the tubes back into the tire casings without having them wrinkle or buckle at some point.

In my tube as described herein there are three plies, 3, 4 and 6 of vulcanized rubber, and even without any compression on the raw gum on account of turning the tube inside out these three plies of vulcanized rubber if stretched after being punctured would bring the edges of the raw gum back together so that they would unite. This gives dual self-sealing protection, first, by the raw gum being compressed on account of being forced into a smaller space, and second, on account of having three plies of vulcanized rubber that will always come back to its original place and bring the raw gum back with it.

In rolling, applying or laying the sheets and strips together to form the tube the plies of rubber may be stepped at each end to permit them to be spliced together with overlapping joints. This may be accomplished by clamping or attaching a washer or collar of the desired formation upon one end of the mandrel and building the plies over this washer or collar to produce a stepped surface for a short distance inside of the tube. In this case the opposite end of the tube will be formed with complementary stepped surfaces upon the outside, which can be done by using plies of different length or clamping a washer or forming plate over the built up rubber tube while it is still plastic and uncured. Two or more stepped surfaces may be provided, depending upon the size of the tube being manufactured. Another way of joining the ends of the tube together is to cut the ends square and abut them, using cement to effect the first union and then permanently vulcanizing the parts together in their meeting surfaces.

What I claim, is:

1. An inflatable self-sealing inner tube for use in tire casings, composed solely of inner and outer annular plies of elastic vulcanized rubber and a semi-annular tacky strip of crude rubber and a semi-annular solid strip of vulcanizable rubber strongly resistant to stretch superposed upon each other and vulcanized together within and to said inner and outer plies.

2. An endless inflatable self-sealing inner tube for use in tire casings, made of inner and outer annular plies of elastic vulcanized rubber, a crescent-shaped strip of vulcanizable rubber strongly resistant to stretch, and a crescent-shaped strip of untreated raw rubber, said strips being superposed in actual contact with each other and vulcanized at their meeting faces to each other and to the contiguous plies, and said raw rubber strip being held in a state of compression by said resistant strip.

3. A process of producing self-sealing, inner tubes adapted to be used in tire casings, consisting in wrapping a sheet of vulcanizable rubber around a mandrel, in applying a thick strip of vulcanizable rubber strongly resistant to stretch upon said wrapping of rubber, in placing a second thick strip of crude rubber upon and in contact with said first strip, in wrapping a second sheet of vulcanizable rubber around said assembly of parts, in applying pressure and heat to said assembly of parts until the parts are vulcanized together and a single tube composed entirely of rubber is produced, in removing said tube from the mandrel and turning it inside out, and in splicing the ends of the reversed tube together to provide an endless tube.

4. A process of producing self-sealing inner tubes for tire casings, consisting in rolling a sheet of vulcanizable rubber around a mandrel, in applying a crescent-shaped layer of rubber upon said rolled sheet of rubber lengthwise of said mandrel, said layer of rubber being compounded with vulcanizing and other ingredients adapted to produce a vulcanized body of rubber with limited stretching properties; in placing a second strip of raw untreated rubber in contact lengthwise with said first strip; in applying an outer ply of vulcanizable rubber around the said strips and in contact with said first sheet; in subjecting the assembled pieces of rubber to pressure and heat until united and vulcanized together; in stripping the vulcanized tube from the mandrel and reversing it inside out to place the incorporated strips under compression; and in joining the ends of the tube.

5. A process of producing self-sealing inner tubes for tire casings, consisting in assembling separate plies and strips of rubber possessing different inherent properties upon a mandrel with the corresponding ends of said different plies and strips in stepped relation; vulcanizing said assembly of plies and strips together to form a tube; and in telescoping and uniting the stepped ends of said tube to form an endless tube.

6. A process of producing self-sealing inner tubes for tire casings, consisting in building up annular plies and semi-annular strips of rubber and forming a plurality of stepped surfaces at opposite ends of the tube to permit said ends to be brought together and united without increase in thickness of the tube where joined together.

7. A self-sealing inner tube composed of separate plies and strips of rubber, including raw gum, said strips forming a plurality of steps at the ends thereof and joined together at such ends to provide a wall of the same thickness as the remainder of said tube.

In testimony whereof I affix my signature in presence of two witnesses.

WILLIAM W. WILDMAN.

Witnesses:
C. R. TUYNHAM,
H. E. NICHOLS.